Figure 1:
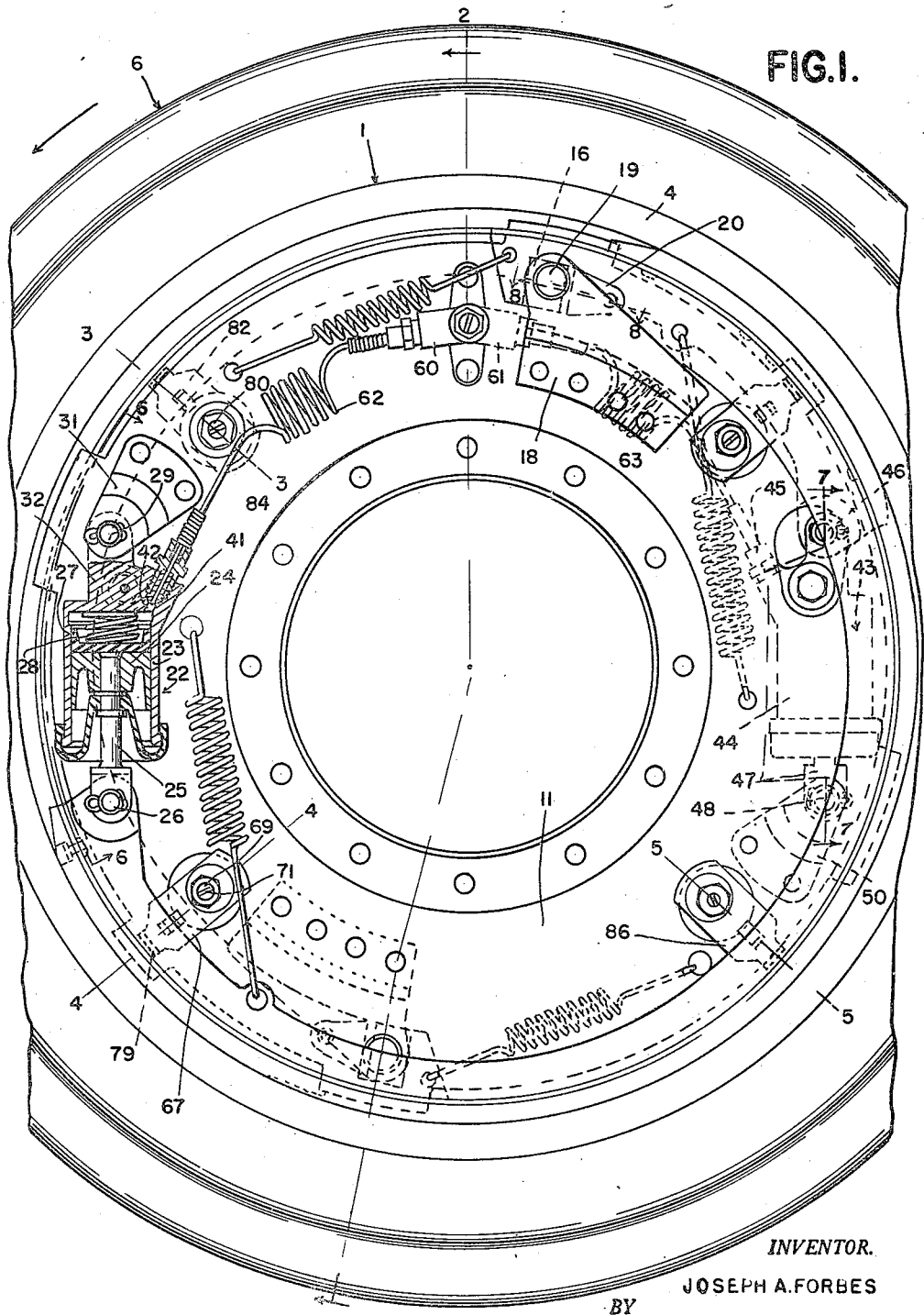
Figure 2:
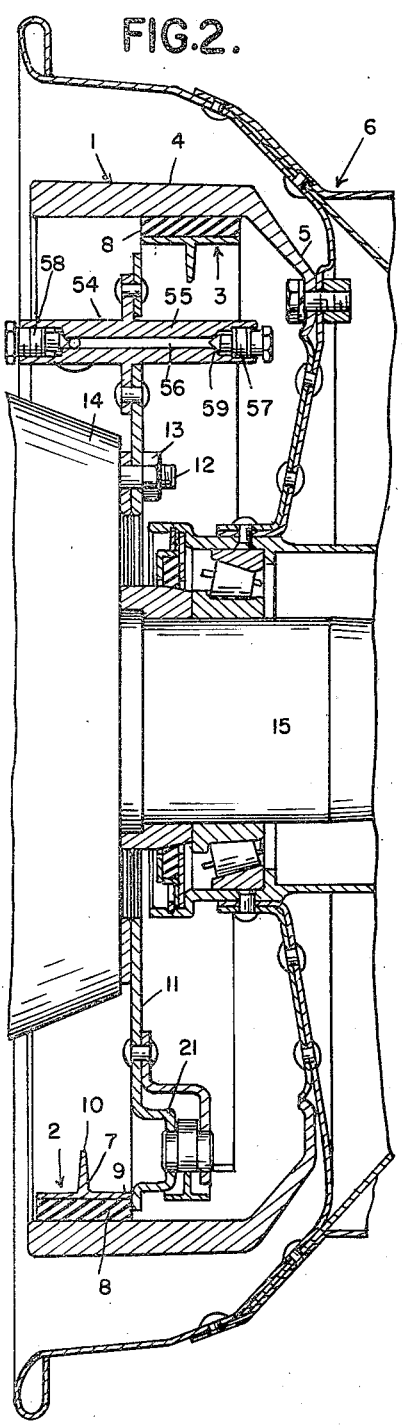

Sept. 11, 1945.  J. A. FORBES  2,384,614
BRAKE
Filed July 26, 1943  3 Sheets-Sheet 1

INVENTOR.
JOSEPH A. FORBES
BY
Whittemore Hulbert + Belknap
ATTORNEYS

Sept. 11, 1945.  J. A. FORBES  2,384,614
BRAKE
Filed July 26, 1943   3 Sheets-Sheet 2

INVENTOR.
JOSEPH A. FORBES
BY
Whittemore Hulbert & Belknap
ATTORNEYS

Sept. 11, 1945.     J. A. FORBES     2,384,614
BRAKE
Filed July 26, 1943     3 Sheets-Sheet 3

INVENTOR.
JOSEPH A. FORBES
BY
*Whittemore Hulbert + Belknap*
ATTORNEYS

Patented Sept. 11, 1945

2,384,614

UNITED STATES PATENT OFFICE 2,384,614

BRAKE

Joseph A. Forbes, Detroit, Mich., assignor to Kelsey-Hayes Wheel Company, Detroit, Mich., a corporation of Delaware Application July 26, 1943, Serial No. 496,191

7 Claims. (Cl. 188—79)

The invention relates to brakes and refers more particularly to brakes of that type having a brake drum and internal brake members engageable with different axial zones of the drum.

The invention has for one of its objects to provide an improved brake of the above type in which the brake members are engageable with the brake drum throughout the major portions of the circumferential extents of the brake drum zones and are arranged to exert substantially balanced pressures upon the brake drum at diametrically opposite sides.

The invention has for other objects to provide a brake in which the carrier plate extends between the brake members and has mounted thereon an improved brake fluid fitting located above and connected by tubes to the upper ends of the wheel cylinders for actuating the brake members; and to provide a brake having an improved positioning means for the brake members, the positioning means comprising a positioning plate mounted on and guided by the carrier plate.

The invention has for a further object to so construct the brake that its parts may be readily assembled for use with either a right-hand wheel or a left-hand wheel.

With these and other objects in view, the invention resides in the novel features of construction and combinations and arrangements of parts as more fully hereinafter set forth.

In the drawings:

Figure 1 is an inboard elevation, partly in section, of a brake embodying the invention;

Figures 2, 3, 4, 5, 6, 7 and 8 are cross sections on the lines 2—2, 3—3, 4—4, 5—5, 6—6, 7—7 and 8—8, respectively, of Figure 1.

As illustrated in Figures 1 to 8, inclusive, the brake comprises the brake drum 1 and the internal brake members 2 and 3 engageable respectively with the inboard and outboard zones of the annular brake flange 4 of the brake drum. The brake drum has the back or web 5 which is secured to the member to be braked which, in the present instance, is the airplane landing wheel 6.

The brake members 2 and 3 are alike, each being engageable with the annular brake flange 4 throughout a major portion of its circumferential extent. Each brake member is anchored at its trailing end and is operatively connected to an actuator at its leading end for the normal rotation of the wheel, as indicated by the arrow in Figure 1. Each brake member is a brake band having a resilient body 7 of T-section and a brake lining 8 secured to the axial flange 9 of the body.

The band has a progressively increasing resistance to flexing from near its leading end to its trailing end while being forced against the annular brake flange, the flexibility being controlled by making the web 10 of the body of progressively increasing height from near its leading end to its trailing end.

The brake members are movably mounted on the carrier plate 11 which is detachably secured by the studs 12 and the nuts 13 to the support 14 having the shaft 15 on which the wheel 6 is journaled.

The anchor for the brake member 2 comprises the block 16 located between the boss 17 of the carrier plate 11 and the bracket 18 which is fixedly secured to the carrier plate. The block has the axially aligned pins 19 extending through the boss and bracket. The trailing end of the web 10 of the brake members 2 is formed with a radial slot which opens radially inwardly and receives the block, the web having secured thereto the U-shaped plate 20 for slidably engaging the block when the brake member 2 is being forced against the annular brake flange 4.

The anchor for the brake member 3 is the same as that for the brake member 2, with the exception that the boss 21 of the carrier plate extends in an outboard direction, instead of an inboard direction.

The actuator 22 for the brake member 2 is a vertical fluid pressure operated actuator or wheel cylinder comprising the cylinder 23, the piston 24 slidable within the cylinder, and the piston rod 25 extending through the lower open end of the cylinder and operatively connected to the leading end of the brake member 2 by the pivot pin 26. A suitable sealing cup 27 preferably formed of rubber is held against the pressure end of the piston by a relatively weak coil spring 28. The cylinder is pivotally mounted at its upper closed end upon the carrier plate 11 by the pivot pin 29 which extends through the boss 30 of the carrier plate, the bracket 31 fixedly secured to the carrier plate and the furcations 32 of the cylinder, the furcations being at opposite sides of the bracket. The cylinder is formed at its closed end with the axially aligned integral short and long bosses 33 and 34, respectively, which extend transversely of the cylinder and the carrier plate. The bosses and the closed end of the cylinder are formed with a bore extending therethrough, the bore having the reduced portion 35 and the enlarged portions 36 and 37 at the ends of the reduced portion and extending to the ends of the bosses 33 and 34, respectively. Like conical seats 38 are provided at the ends of the enlarged portions adjacent the reduced portion. The enlarged portions are internally threaded and adapted to interchangeably receive the plug 39 which has an integral stem for fitting either of the conical seats 38. As illustrated, the plug 39 is threaded into the long boss 34 and prevents flow of the braking liquid through this boss while the short boss 33 is adapted to have threaded thereinto the coupling for connecting the short boss to the tube leading to the master cylinder. The reduced portion 35 is placed in communication with the pressure chamber of the actuator by means of the bore 40. The cylinder is also provided at the side of its closed end opposite the annular brake flange with the upwardly inclined integral boss 41 which has the bleed bore 42 opening into the pressure chamber of the actuator.

The actuator 43 for the brake member 3 is a vertical fluid pressure operated actuator or wheel cylinder diametrically opposite and of the same general construction as the actuator 22. The actuator 43 has the cylinder 44 which is closed at its upper end and has at the side of its closed end opposite the annular brake flange the upwardly inclined integral boss 45 which has a bleed bore opening into the pressure chamber of the actuator. The closed upper end is pivotally connected by the pivot pin 46 to the leading end of the brake member 3 and the piston rod 47 is pivotally connected by the pivot pin 48 to the boss 49 of the carrier plate and the bracket 50 fixedly secured to the carrier plate. The arrangement of the short and long bosses 51 and 52 is the reverse of that of the short and long bosses 33 and 34 of the actuator 22, the short boss 51 extending in an outboard direction and having its end in the plane of the end of the long boss 34 and being closed by the plug 53. The long boss 52 extends in an inboard direction and has its end in the plane of the end of the short boss 33 and adapted to have threaded thereinto the coupling for connection to the tube leading to the master cylinder.

To bleed the actuators there is the fitting 54 mounted on the carrier plate 11 above the actuators and substantially midway therebetween. This fitting has the body 55 extending transversely through the carrier plate and axially of the brake and provided with the axial bore 56 therethrough. The end portions of the bore are enlarged and internally threaded to interchangeably receive the plug 57 and the bleed plug 58. The inner ends of the enlarged portions of the bore are formed with like conical seats 59 which are adapted to be engaged by conical ends upon the stems of the plugs. The body 55 is provided with the transverse bosses 60 and 61 on opposite sides of the carrier plate 11, each boss having a bore opening into the axial bore 56. 62 is a flexible tube connecting the boss 60 and the boss 41 of the actuator 22 and 63 is a flexible tube connecting the boss 61 and the boss 45 of the actuator 43. These tubes provide for movement of the actuators relative to the carrier plate and serve to conduct air from the pressure chambers of the actuators to the fitting from which it may escape by opening the bleed plug.

For the purpose of positioning the brake members 2 and 3 concentrically within the annular brake flange 4 of the brake drum 1 angularly spaced positioning devices are adjustably mounted upon the carrier plate 11. These positioning devices are arranged in pairs substantially at right angles to each other with the devices of each pair diametrically opposite each other and constructed in the same manner. The devices of one pair are adapted to position both brake members and the devices of the other pair are adapted to position either one or the other of the brake members. As shown particularly in Figure 4, a device for positioning both brake members comprises the rod 64 which extends transversely through the carrier plate 11, the eccentrics 65 and 66 sleeved on the rod and the positioning plates 67 and 68. The rod 64 has the externally threaded ends 69 and 70 each of which is preferably provided with the diametral slot 71 for receiving a suitable tool, such as a screw driver. The rod has intermediate its ends and preferably integral therewith the collar 72 which is journaled in the carrier plate 11 and which has an axial dimension or width greater than the thickness of the carrier plate. Each of the eccentrics 65 and 66 has the spacer portion 73 and the eccentric portion 74 and the eccentric portions extend through circular openings in the radially inner portions of the positioning plates. Spring washers 75 at opposite sides of the carrier plate and normally dished at their radially outer edges toward the carrier plate are provided between the collar 72 and the carrier plate 11 and the eccentric portions 74 and nuts 76 threaded upon the ends 69 and 70 of the rod are adapted to clamp the eccentrics to the rod and carrier plate. The positioning plates are formed radially outwardly of the spring washers 75 with the transversely extending ears 77 extending toward each other and into the radial slot 78 formed in the carrier plate. The positioning plates are also provided at their radially outer ends with the transverse terminal flanges 79 extending away from each other and engageable with the radially inner sides of the axial flanges 9 of the brake members 2 and 3. The construction is such that by loosening the inboard nut 76 on the inboard end 69 of the rod 64 the rod may be rotatably adjusted as by means of a screw driver inserted into the slot 71 in the inboard end of the the rod to thereby turn the eccentric 66 and adjust the outboard positioning plate 68 and, as a consequence, the brake member 3. This may be done because the eccentric 66 is firmly clamped in place on the rod between the spring washer 75 abutting the collar 72 and the nut 76 threaded on the outboard end 70 of the rod. After the desired adjustment has been made for the brake member 3, the eccentric 65 may then be adjusted, it having a polygonal wrench engaging portion at its end remote from the eccentric portion. Then when the desired adjustment for the brake member 2 has been made, the nut 76 at the inboard end of the rod may be tightened and this nut through the eccentrics and the spring washers clamps the device on the carrier plate.

Figure 3:
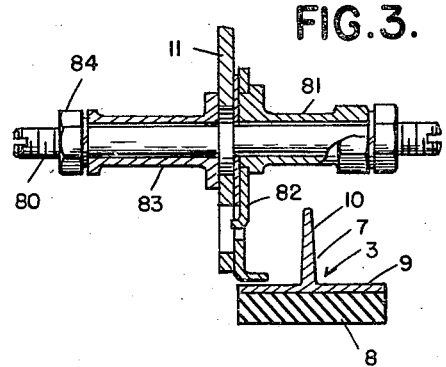
Figure 4:
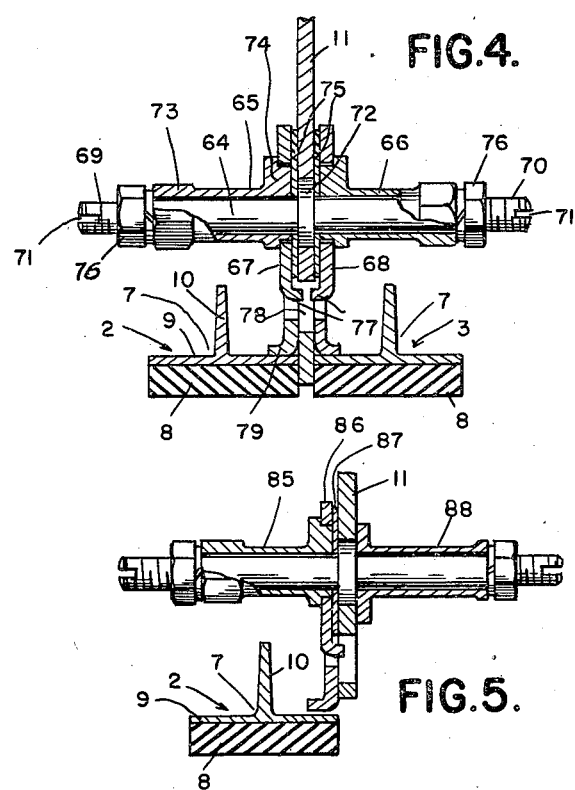

The positioning device shown particularly in Figure 3 comprises the rod 80 which is the same as the rod 64, the eccentric 81 which is the same as the eccentric 66 and the positioning plate 82 which is the same as the positioning plate 68. For serving as a spacer when clamping the eccentric 81 in place on the carrier plate 11, I have provided the spacer 83 sleeved upon the rod at the side of the carrier plate opposite the eccentric 81 and engageable by the nut 84. This construction serves to assist in adjustably positioning the brake member 3. In operation, it will be seen that the eccentric is tightly clamped upon the rod and frictionally held from turning by the spring washer between the carrier plate and the eccentric portion of the eccentric. However, upon loosening the nut 84 the rod can be readily rotated by means of a screw driver or the like to position the brake member 3 through the positioning plate 82, after which the nut can be tightened to clamp the parts in their rotative positions of adjustment.

Figure 5:
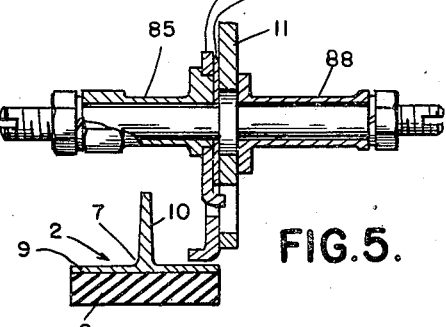
Figure 7:
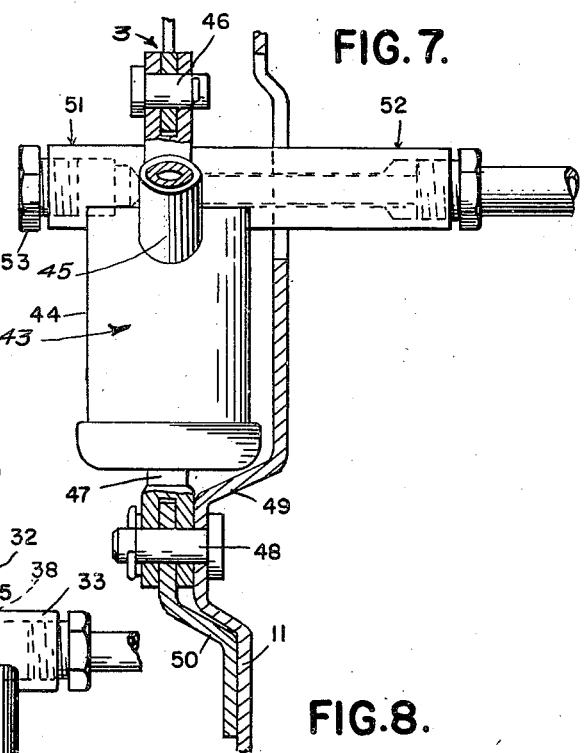
Figure 6:
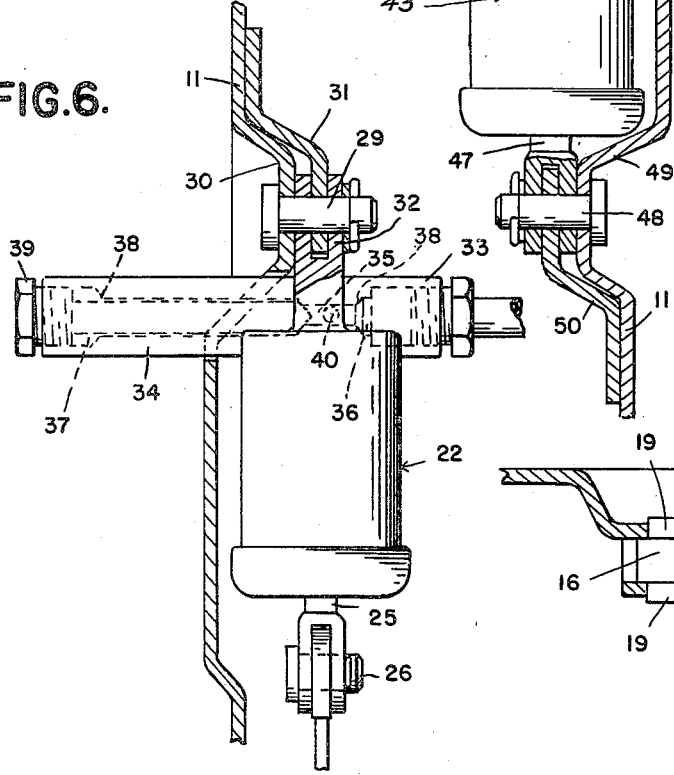
Figure 8:
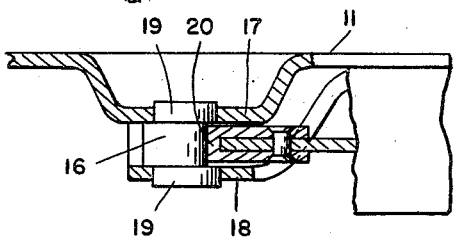

The device illustrated in Figure 5 is very similar to that illustrated in Figure 3, but differs essentially in mounting the eccentric 85, the positioning plate 86 and the spring washer 87 at the inboard side of the carrier plate 11, instead of the outboard side, as in Figure 3. In this case the spacer 88 is firmly clamped against the collar of the rod so that adjustment is made possible by loosening the nut at the inboard end of the eccentric, after which the eccentric may be turned on the rod by means of a wrench or the like engaging the polygonal wrench engaging portion at the inboard end of the eccentric.

The construction of brake is such that the brake members are engageable with the brake drum throughout the major portions of the circumferential extents of the brake drum zones and the actuators are diametrically opposite each other and operatively connected to the brake members at their leading ends and also the anchors are diametrically opposite each other and at the trailing ends of the brake members. As a result the brake members exert substantially balanced pressures upon the brake drum at diametrically opposite sides. By reason of the actuators having closed upper ends connected to the bleed fitting, proper bleeding may be readily secured. Furthermore, by reason of the construction of bleed fitting and braking fluid inlet bosses for the actuators the brake may be readily used with either a right hand wheel or a left hand wheel merely by reversing the plugs without reversing the carrier plate. Furthermore, by reason of the construction of positioning devices for the brake members use of the brake with either a right hand wheel or a left hand wheel is facilitated inasmuch as the positioning devices may all be adjusted from their inboard ends which are accessible.

What I claim as my invention is:

1. A brake comprising a brake drum, a pair of internal brake bands engageable with different axial zones of said drum throughout the major portions of their circumferential extents, a carrier plate, a wheel cylinder mounted on said plate for each band and operatively connected to an end thereof, an anchor mounted on said plate for each band located at an end thereof, said wheel cylinders being diametrically opposite each other and said anchors being diametrically opposite each other so that said bands when forced against said drum exert substantially balanced pressures upon said drum at diametrically opposite sides thereof, a brake fluid fitting mounted on said plate above said wheel cylinders, and tubes between said fitting and the upper ends of said wheel cylinders.

2. A brake comprising a brake drum, a pair of internal brake members engageable with different axial zones of said drum, a carrier plate extending between said brake members, an actuator mounted on said carrier plate operatively connected to each of said brake members, an anchor on said carrier plate for each of said brake members, and means for positioning each of said brake members relative to said drum comprising a positioning plate at one side of said carrier plate and engageable with a brake member, an eccentric on said carrier plate for moving said positioning plate, and cooperating means on said plates for guiding said positioning plate relative to said carrier plate.

3. A brake comprising a brake drum, a pair of internal brake members engageable with different axial zones of said drum, a carrier plate extending between said brake members and provided with radial slots, an actuator on said carrier plate operatively connected to each of said brake members, an anchor on said carrier plate for each of said brake members, and means for positioning each of said brake members relative to said drum comprising a positioning plate at one side of said carrier plate and engageable with a brake member, said positioning plate having a projection extending into one of said slots, and an eccentric on said carrier plate for moving said positioning plate.

4. A brake comprising a brake drum, a pair of internal brake members engageable with different axial zones of said drum, a carrier plate extending between said brake members and means for positioning said brake members relative to said drum comprising a rod extending transversely through said carrier plate and journaled therein, eccentrics at opposite sides of said carrier plate sleeved on said rod, positioning plates at opposite sides of said carrier plate mounted on said eccentrics and engageable with said brake members, and co-operating means on said rod for clamping said eccentrics to said rod and for also clamping said eccentrics and rod to said carrier plate.

5. A brake comprising a brake drum, an internal brake member engageable with said drum, a carrier plate and means for positioning said brake member relative to said drum comprising a rod extending transversely of said carrier plate and having intermediate its ends a collar journaled in said carrier plate, an eccentric sleeved on said rod, a positioning plate on said eccentric engageable with said brake member, means on said rod for clamping said eccentric against said collar, and other means on said rod for securing said eccentric and rod in place on said carrier plate.

6. A brake comprising a brake drum, a pair of internal brake members engageable with different axial zones of said drum, a carrier plate extending between said brake members, fluid pressure operated actuators mounted on said carrier plate and operatively connected to said brake members and a bleed fitting above said actuators and mounted on and extending transversely of said carrier plate and connected to the pressure chambers of said actuators, said fitting having its ends interchangeably receiving a plug and a bleed plug to provide for use of the brake with either a right hand wheel or a left hand wheel.

7. A brake comprising a brake drum, a pair of internal brake members engageable with different axial zones of said drum, a carrier plate extending between said brake members, and fluid pressure operated actuators mounted on said carrier plate at opposite sides thereof and operatively connected to said brake members, said actuators having axially aligned short and long bosses extending transversely of said carrier plate with the bosses of each actuator interchangeably receiving a plug and a fluid conduit fitting to provide for use of the brake with either a right hand wheel or a left hand wheel.

JOSEPH A. FORBES.